US007062220B2

(12) United States Patent
Haynes et al.

(10) Patent No.: US 7,062,220 B2
(45) Date of Patent: Jun. 13, 2006

(54) AUTOMATED, COMPUTER-BASED READING TUTORING SYSTEMS AND METHODS

(75) Inventors: Jacqueline A. Haynes, Rockville, MD (US); Daniel S. Fowler, Washington, DC (US); Shannon L. Beltz, North Potomac, MD (US)

(73) Assignee: Intelligent Automation, Inc., Rockville, MD (US)

( * ) Notice: Subject to any disclaimer, the term of this patent is extended or adjusted under 35 U.S.C. 154(b) by 643 days.

(21) Appl. No.: 09/836,165

(22) Filed: Apr. 18, 2001

(65) Prior Publication Data

US 2002/0156632 A1 Oct. 24, 2002

(51) Int. Cl.
*G09B 13/00* (2006.01)
(52) U.S. Cl. ...................... 434/353; 434/362
(58) Field of Classification Search ............... 434/322, 434/323, 350, 362, 365, 118, 307 R, 167–169; 706/11, 14
See application file for complete search history.

(56) References Cited

U.S. PATENT DOCUMENTS

| | | | |
|---|---|---|---|
| 4,547,161 A | * | 10/1985 | Manning .................... 434/358 |
| 4,561,061 A | | 12/1985 | Sakamoto et al. |
| 4,636,173 A | | 1/1987 | Mossman |
| 4,650,423 A | | 3/1987 | Sprague et al. |

(Continued)

FOREIGN PATENT DOCUMENTS

EP 0063047 A2 10/1982

OTHER PUBLICATIONS

"Maximum Likelihood from Incomplete Data via $EM$ A;gorithm", A. P. Dempster, N.M. Laird, D.B. Rubin, Journal of the Royal Statistical Society, Series B (Methodological), vol. 39, Issue 1 (1977), pp. 1-38.

(Continued)

*Primary Examiner*—Monica Carter
*Assistant Examiner*—Kathleen Mosser

(57) ABSTRACT

An automated, computer-based reading tutoring system is accessed via a computer system and includes a plurality of instructional passages of different, predetermined levels of reading difficulty. A semantic space module of the reading tutoring system operates on a semantic space, which is produced by a machine-learning method, to automatically evaluate a student-submitted summary of a selected instructional passage for congruence with the selected instructional passage and to automatically determine which instructional passage the student should optimally read next. The reading tutoring system includes immediate feedback data provided to the student and including an indicator reflective of the student's reading comprehension and the identity of the instructional passage that the student should read next. An automated, computer-based method of reading tutoring comprises the steps of receiving a student-submitted summary of a selected instructional passage from a domain of discourse, automatically evaluating the summary to obtain a measure of the student's reading comprehension and, based on this evaluation, automatically selecting an instructional passage for the student to read next.

42 Claims, 7 Drawing Sheets

U.S. PATENT DOCUMENTS

| | | |
|---|---|---|
| 4,839,853 A | 6/1989 | Deerwester et al. |
| 4,958,284 A * | 9/1990 | Bishop et al. .............. 434/353 |
| 5,301,109 A | 4/1994 | Landauer et al. |
| 5,317,507 A | 5/1994 | Gallant |
| 5,325,298 A | 6/1994 | Gallant |
| 5,451,163 A | 9/1995 | Black |
| 5,659,732 A | 8/1997 | Kirsch |
| 5,659,766 A | 8/1997 | Saund et al. |
| 5,675,710 A | 10/1997 | Lewis |
| 5,687,364 A | 11/1997 | Saund et al. |
| 5,703,655 A | 12/1997 | Corey et al. |
| 5,835,893 A | 11/1998 | Ushioda |
| 5,839,106 A | 11/1998 | Bellegarda |
| 5,867,799 A | 2/1999 | Lang et al. |
| 5,873,056 A | 2/1999 | Liddy et al. |
| 5,983,214 A | 11/1999 | Lang et al. |
| 5,987,446 A | 11/1999 | Corey et al. |
| 6,006,223 A | 12/1999 | Agrawal et al. |
| 6,115,683 A * | 9/2000 | Burstein et al. ............. 434/353 |
| 6,181,909 B1 * | 1/2001 | Burstein et al. ............. 434/353 |
| 6,254,395 B1 * | 7/2001 | Breland et al. ............. 434/156 |
| 6,361,326 B1 * | 3/2002 | Fontana et al. ............. 434/322 |
| 6,366,759 B1 * | 4/2002 | Burstein et al. ............. 434/353 |
| 6,461,166 B1 * | 10/2002 | Berman ...................... 434/323 |
| 6,544,039 B1 * | 4/2003 | Fiedorowicz et al. ....... 434/167 |
| 6,632,174 B1 | 10/2003 | Breznitz |
| 2001/0018177 A1 * | 8/2001 | Dusen ........................ 434/156 |
| 2002/0142277 A1 * | 10/2002 | Burstein et al. ............. 434/335 |
| 2002/0160347 A1 * | 10/2002 | Wallace et al. ............. 434/322 |

OTHER PUBLICATIONS

"Producing high-dimensional semantic spaces from lexical co-occurrence", Kevin Lund and Curt Burgess, University of California, Riverside, California, Behavior Research Methods, Instruments & Computers 1996, 28 (2), pp. 203-208.

* cited by examiner

AUTOMATED, COMPUTER-BASED READING TUTORING SYSTEMS AND METHODS

BACKGROUND OF THE INVENTION

1. Field of the Invention

The present invention relates generally to literacy tutoring and, more specifically, to automated, computer-based reading tutoring systems and methods particularly adapted to provide literacy tutoring in conjunction with user-specific content learning.

2. Brief Description of the Related Art

The demand for alternatives to traditional classroom instruction has been steadily growing, with increasing numbers of individuals being interested in self-guided learning experiences for personal fulfillment and/or career development. Concomitantly, many institutions are recognizing the need to implement educational and training opportunities to retain motivated employees and to remain competitive. Various institutions, for example, are being called upon to provide options for independent study using distance learning technologies. Presently available computer-based education or training, while responding to the aforementioned demands, has presented numerous drawbacks. Many computer-based training systems and methods (CBT) have proven to be too simplistic and "lock-step" to be of much value beyond the acquisition of rudimentary skills or information. Intelligent tutoring systems and methods (ITS) have proven valuable in some highly constrained domains, but generally require levels of effort and expense that are impractical for most applications.

In the area of literacy, there is a great need for self-guided reading tutoring systems and methods to improve the reading skills of learners of various ages. Many learners, particularly adults, are more comfortable and motivated to learn when in a private setting without the fear of public scrutiny and embarrassment. Self-guided reading tutoring systems and methods allow students to learn in comfort and privacy as well as to set their own time and pace for learning, which might otherwise not be possible in a traditional classroom setting.

Non-automated reading tutorials utilizing a hierarchical series of reading passages arranged according to levels of difficulty have been proposed. The passages typically derive from multiple sources and relate to a single topic. A student is assigned the least difficult passage to read, and an instructor thereafter manually evaluates the student's understanding of the passage. Where adequate comprehension is demonstrated, the student advances to the next level of difficulty, and the instructor must repeat the process of manually evaluating the student's reading comprehension at each level and selecting the next reading passage. Where the student fails to pass a particular level, the procedure is repeated for as many passages as needed at the same level until the student passes. Since reading tutoring systems and methods of the aforementioned type are very labor intensive, standardized generic instructional materials are developed and used with all students regardless of a student's interests, work experience, work requirements, prior knowledge of the subject matter, and individual learning differences. Unless a student happens to be interested in the subject matter, has frequent and timely interactions with an instructor, and is able to progress quickly and easily through the levels of difficulty, whatever motivation the student initially brings to the task is soon dissipated. Furthermore, traditional reading tutorials of this type are usually lacking in specific features by which vocabulary and reading fluency skills can be effectively enhanced.

An example of a self-paced, "CBT-like" educational package including a reading tutorial is the PLATO ® educational package developed by TRO Learning, Inc. The PLATO ® reading series is less labor intensive than traditional manual reading tutorials, but does not incorporate artificial intelligence to provide customized, learner-specific guidance and motivation. As with traditional manual reading tutorials, the PLATO ® reading series is pre-packaged with generic content.

There is significant agreement among educators and researchers that a student's ability to produce a good summary of lesson text is superior to other forms of assessment in evaluating the student's reading comprehension and that learning to write good summaries of lesson text is an effective way to develop reading comprehension strategies and skills. A major drawback to using student summaries for instruction and assessment of reading comprehension, however, is the time and effort required for human experts to evaluate the summaries and provide timely feedback to the student. Since written summaries must be scored by a human instructor, a significant delay in time ensues before the results of the scoring can be used to enable instruction to proceed. Accordingly, it is more typical for reading comprehension to be assessed using objective questions that can be scored automatically, but which are less valid in measuring actual comprehension.

A major impediment to providing automated, computer-based reading tutoring systems and methods is the difficulty involved in automating the critical functions of an expert human tutor to achieve an "ITS-like" learning experience with a "CBT-like" expenditure of effort and expense. In particular, the inability to automate the analysis and structuring of textual instructional material within a very large domain of discourse, the evaluation of a student's current reading level, the determination of the student's understanding of the instructional material, and the generation of recommendations about the next level of reading difficulty appropriate for the student are great deterrents to the implementation of automated, computer-based reading tutorials. While latent semantic analysis (LSA), a fully automatic mathematical/statistical technique for extracting and inferring relations of expected contextual usage of words in passages of discourse, has been found capable of simulating a variety of human cognitive phenomena, its applicability to automated, computer-based reading tutoring systems and methods has thus far not been recognized. U.S. Pat. No. 5,987,446 to Corey et al., U.S. Pat. No. 5,839,106 to Bellegarda, U.S. Pat. No. 5,301,019 to Landauer et al., and U.S. Pat. No. 4,839,853 to Deerwester et al. are representative of prior applications for latent semantic techniques.

Reading accuracy and fluency are known to play an important role in developing reading comprehension. Oral reading fluency is important because, without developing sufficient speed to maintain important sentence structures in short term memory, comprehension fails due to insufficiency of memory resources. Therefore, developing sufficient speed and fluency in reading are critical to improving reading comprehension. While speed in reading is greatly improved by repetition and practice, most learners are likely to avoid practice opportunities that might arise in traditional classroom settings due to the fear of failure. One-on-one fluency tutoring can be conducted with less fear of embarrassment, but is cost-prohibitive and impractical for most learners. Traditional reading tutorials, which typically are lacking in fluency instruction, thusly fail to address the needs of learners for whom the speed and accuracy with which they read are obstacles to improved reading comprehension. In particular, it is not possible with traditional reading tutorials to practice oral reading fluency in an automated environment using speech recognition software.

SUMMARY OF THE INVENTION

Accordingly, it is a primary object of the present invention to overcome the aforementioned disadvantages of prior reading tutoring systems and methods.

Another object of the present invention is to incorporate artificial intelligence in a reading tutorial to provide learner-specific guidance and motivation.

A further object of the present invention is to utilize user-specific instructional material in automated, computer-based reading tutoring systems and methods.

An additional object of the present invention is to automate the analysis of student-produced summaries of lesson text in reading tutoring systems and methods as a measure of reading comprehension.

It is also an object of the present invention to automatically guide a student to the appropriate level of reading difficulty in a large body of lesson text of a reading tutorial, so as to develop a path of optimal learnabilty through the lesson text.

Yet another object of the present invention is to utilize machine learning algorithms to automate computer-based reading tutoring systems and methods.

The present invention has as a further object to incorporate voice recognition in automated, computer-based reading tutoring systems and methods.

A still further object of the present invention is to incorporate automated summary, vocabulary and/or fluency tutors in computer-based reading tutoring systems and methods.

Additionally, it is an object of the present invention to provide immediate feedback regarding the quality of a summary submitted by a student to assess reading comprehension in computer-based reading tutoring systems and methods.

Some of the advantages of the present invention are that the computer-based reading tutoring systems and methods are designed so students spend most of the instructional time engaged in reading; the summaries used to assess a student's reading comprehension may be submitted audibly so that assessing reading comprehension skill is not confounded with writing skill; a student's understanding of the subject matter of the lesson text before and after reading each passage or lesson is used to effectively identify the most appropriate passage or lesson to be attempted next; a student is assisted in developing comprehension of the lesson text as well as strategies to improve comprehension skills in general; the computer-based reading tutoring systems and methods are more effective, less costly to develop and administer, and are more engaging for the student than traditional reading tutorials; the computer-based reading tutoring systems and methods are particularly adaptable to adult learners but may be designed for various age groups and reading levels; the student's motivation and interest are maintained via immediate feedback, interactive exercises and the realization of a successful experience based on user-specific selection of lesson text; the computer-based reading tutoring systems and methods may incorporate safeguards against suspect summaries; the computer-based reading tutoring systems and methods may contain a broad variety of content areas selected for individual students, or self-selected, based on various individually-suited purposes; the need for human instructors is eliminated; students with a history of unsuccessful reading and testing will feel more comfortable and less intimidated; and new instructional materials may be introduced into the automated, computer-based reading tutoring systems and methods with minimal authoring effort.

These and other objects, advantages and benefits are realized with the present invention as generally characterized in a reading tutoring system including at least one domain of discourse accessible by a student via a computer system and comprising a plurality of instructional passages of different, predetermined levels of reading difficulty for the student to read via a monitor of the computer system. One or more semantic space modules of the reading tutoring system receives a summary of a selected instructional passage prepared by the student and submitted via the computer system either audibly or in writing. The one or more semantic space modules uses semantic spaces produced by latent semantic analysis (LSA) or other machine learning methods to automatically evaluate the summary for congruence of content with the selected instructional passage and, based on the degree of congruence, to automatically determine which instructional passage from the domain of discourse the student should read next. The reading tutoring system includes immediate feedback data provided to the student via the computer system, the immediate feedback data comprising an indicator reflective of the degree of congruence between the summary and the selected instructional passage, and comprising the identity of the instructional passage that the student should read next. The reading tutoring system may also include a comprehension tutor module, a vocabulary tutor module and/or a fluency tutor module selectively accessible by the student or assigned to the student via the computer system. The comprehension tutor module communicates key words from the selected instructional passage via the computer system and presents the student with interactive summarizing instruction and exercises including the option of submitting a practice summary of the selected instructional passage. Where a practice summary is submitted, the one or more machine learning modules of the reading tutoring system evaluates the practice summary for congruence of content with the selected instructional passage. The immediate feedback data includes information regarding the student's responses to the interactive practice exercises and the quality of the practice summary where a practice summary is submitted. The vocabulary tutor module communicates principal vocabulary words via the computer system, including the communication of definitions, synonyms, antonyms, samples of correct usage and interactive practice exercises for the principal vocabulary words. Where the interactive practice exercises are utilized, the vocabulary tutor module evaluates the student's responses to the interactive practice exercises, and the immediate feedback data includes information regarding the student's performance on the interactive practice exercises. The fluency tutor module is implemented using a voice recognition system of the reading tutoring system and audibly communicates an audibly correct reading of the instructional passage for the student to listen to. The fluency tutor module receives an audible reading of the selected instructional passage by the student and automatically evaluates the student's reading for accuracy and speed. Where the fluency tutor module is utilized, the immediate feedback data includes information regarding the accuracy and speed of the student's reading.

The present invention is further characterized in an automated, computer-based method of reading tutoring comprising the steps of providing a domain of discourse accessible by a student via a computer system and including a plurality of instructional passages of different, predetermined levels of reading difficulty, selecting an instructional passage for the student to read on a monitor of the computer system, receiving a summary of the selected instructional passage prepared by the student and submitted via the computer system, automatically evaluating the summary for congruence with the selected instructional passage to obtain a measure of the student's reading comprehension, automatically selecting an instructional passage from the domain that the student should read next based on the congruence of the summary with the other instructional passages, communicating feedback data to the student via the computer system including an indicator reflective of the student's reading comprehension and including the identity of the instructional passage to read next, and repeating the receiving, the automatically evaluating, the automatically selecting and the communicating steps for the instructional passage that the student reads next.

The present invention is also characterized in an automated, computer-based method of self-guided reading tutoring comprising the steps of accessing a domain of discourse of a reading tutoring system via a computer system, reading an assigned instructional passage from the domain of discourse via a monitor of the computer system, preparing a summary of the assigned instructional passage, submitting the summary to the reading tutoring system via the computer system, receiving immediate feedback data from the reading tutoring system including an indicator reflective of the congruence of the summary with the assigned instructional passage and including the identity of a recommended instructional passage from the domain that should be read next based on the congruence of the summary with the assigned instructional passage, and repeating the steps of reading, preparing, submitting and receiving for the recommended instructional passage.

These and other objects, advantages and benefits of the present invention will become apparent upon consideration of the following detailed description of preferred embodiments thereof, particularly when taken in conjunction with the accompanying drawings, wherein like reference numerals in the various figures are utilized to designate like or similar components.

DESCRIPTION OF THE PREFERRED EMBODIMENTS

Figure 1:
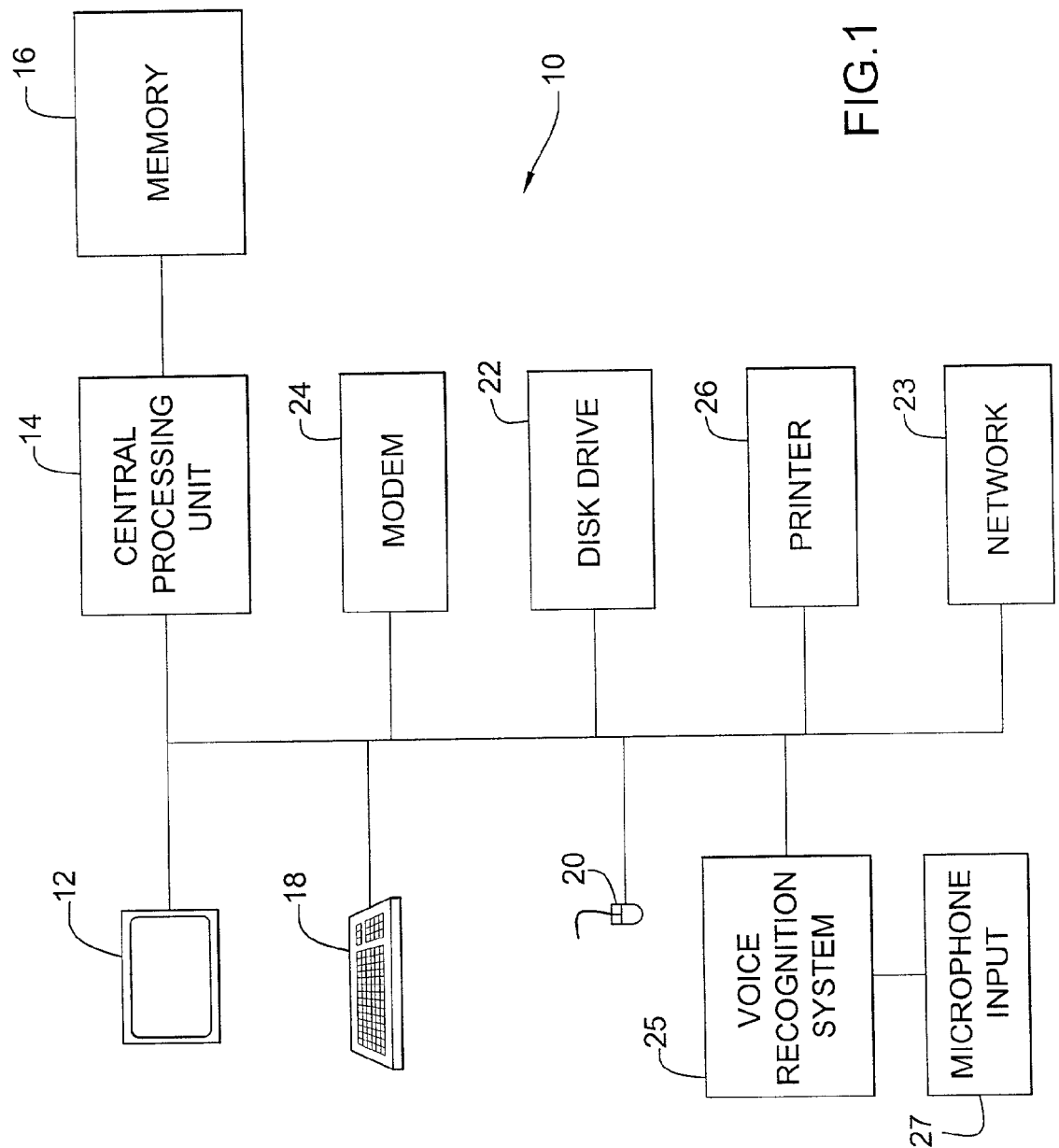
FIG. 1 illustrates, partly in block diagram, a computer system for implementing the reading tutoring systems and methods according to the present invention.

The reading tutoring systems and methods according to the present invention are implemented using a conventional computer system, such as computer system 10 illustrated in FIG. 1. Computer system 10 typically includes a monitor 12 for visually displaying information to a user, a central processing unit 14, internal memory 16, a keyboard 18 for inputting information to central processing unit 14, and a mouse 20 for selecting icons displayed on monitor 12. A disk drive 22 and modem 24 of computer system 10 provide alternate avenues for data input to the central processing unit 14. Computer system 10 may include a voice recognition system 25 with a microphone input 27 for voice input. Computer system 10 communicates with a user graphically via monitor 12, as well as audibly. A printer 26 of computer system 10 allows output data to be embodied in tangible print form. The reading tutoring systems and methods of the present invention can be embodied in a stand-alone program for computer system 10 and/or an internet/intranet network database application accessible via computer system 10 as represented by network 23. Implementation as a WWW-based application allows use of a single URL for accessing the reading tutoring system. Preferably, the reading tutoring systems and methods of the present invention will operate under the Windows 95/98/NT operating system, as a standalone program, and as a client-server WWW-based network application. The internet version of the reading tutoring systems will typically have a client/server split with all GUI/interactive tutoring on the client side and all command/assessment functions on the server side.

Figure 2:
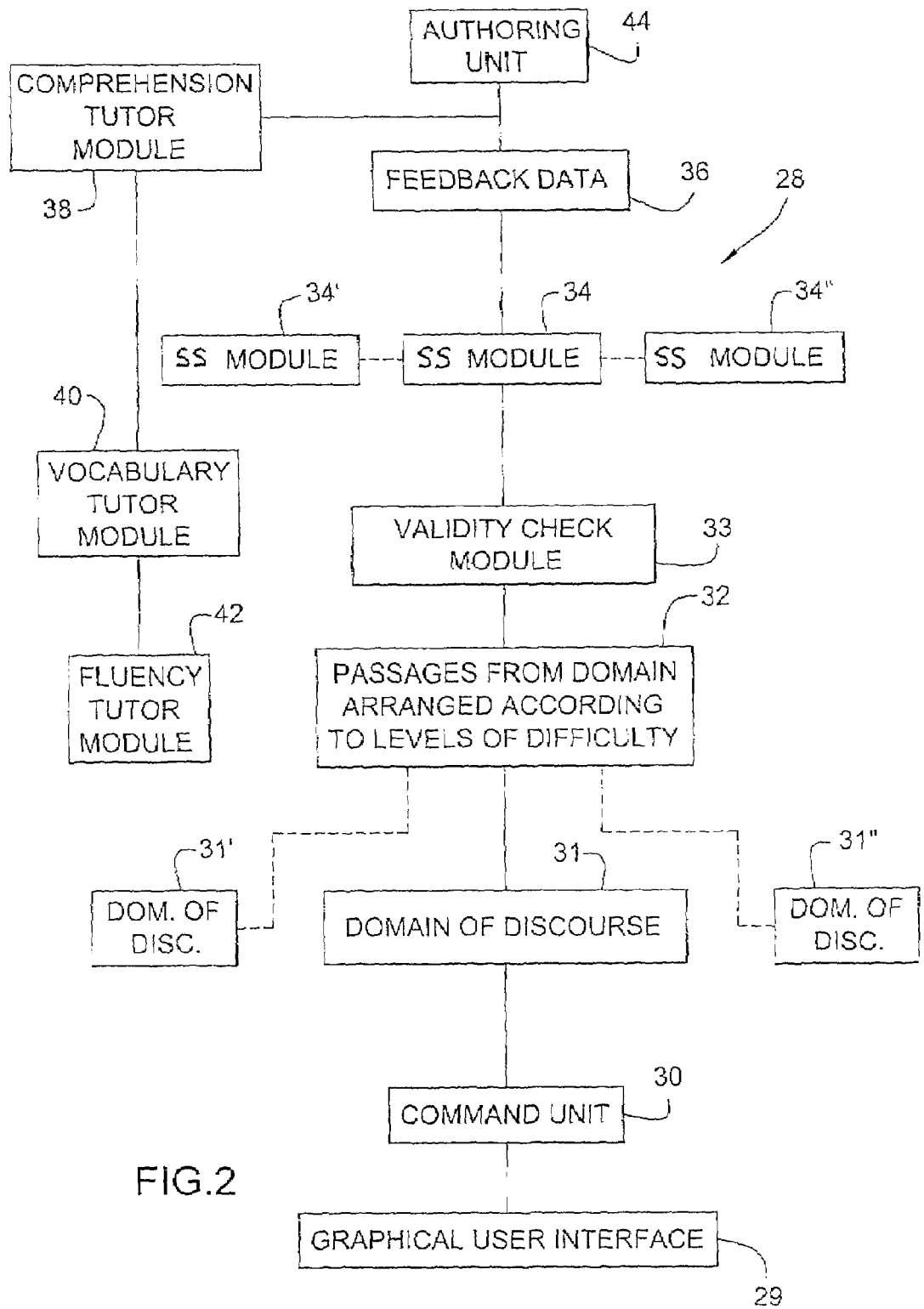
FIG. 2 illustrates in block diagram a reading tutoring system according to the present invention.

A reading tutoring system 28 according to the present invention is illustrated in block diagram in FIG. 2 and includes a graphical user interface (GUI) 29 by which a student, i.e. a user of the reading tutoring system, interacts with the reading tutoring system, a command unit 30 comprising software for executing the various diverse functions performed by the reading tutoring system, at least one domain of discourse 31 accessible via the computer system 10 for display on monitor 12, a validity check module 33, at least one semantic space module (SS module) 34, and feedback data or information 36. The graphical user interface (GUI) 29 is a user-friendly interface by which the reading tutoring system communicates visually or graphically or audibly with a student and by which the student interacts with the reading tutoring system via the computer system 10. Graphical user interface 29 includes a "student login" by which the student is prompted, typically via monitor 12, to enter an identifier such as an "ID" and "password". The reading tutoring system 28 stores information associated with a student's "ID" and "password" including history of use for the student, which may be displayed on monitor 12. The graphical user interface 29 includes a display option allowing the student to begin with a new lesson or to continue a lesson previously begun. The graphical user interface 29 further includes multi-media introduction and help information, which may depict a person or persons with whom the student will make a positive identification. A "quit" option of the graphical user interface 29 is always available, with the ability for the student to re-start at the same point. Preferably, the graphical user interface 29 includes instruction and cues in graphical or textual and/or audio form. The graphical user interface may also provide means for students to select speech tasks and to control the recording of orally read summaries as discussed further below.

The command unit 30 includes a body of software controlling operation of the reading tutoring system and managing the student's interaction therewith. The command unit 30 controls the exchange of visual and audible information with the student in response to selections and input entered by the student.

Domain of discourse 31 is a database comprising a large corpus of text relating to a topic or subject that is relevant to a student, based on personal interest, job or career relatedness, need for information and/or other individually-suited purposes. The domain of discourse 31 includes a plurality of passages or lessons 32 arranged hierarchically according to their levels of reading difficulty or content and used as instructional passages in the reading tutoring system. The semantic space module 34 receives a summary of an assigned passage 32 read by the student from the domain of discourse 31, the assigned passage being displayed on monitor 12. The summary can be submitted in writing, via the keyboard 18, or orally via the voice recognition system 25 of the reading tutoring system. After the validity check module 33 "checks" or evaluates the student-submitted summary for plagiarism and/or other anomalies, the semantic space module 34 automatically evaluates or "scores" the student-submitted summary to assess the student's comprehension of the assigned passage. Based on this evaluation, the reading tutoring system determines the passage of appropriate reading difficulty that the student should read next. Feedback data or information 36 is provided to the student immediately via computer system 10 in accordance with the evaluation performed by the one or more machine learning modules.

The reading tutoring system 28 includes at least one domain of discourse 31 but may include one or more additional domains of discourse, such as domains of discourse 31' and 31" shown in FIG. 2. The domains of discourse 31' and 31' are accessible via the computer system and may relate to the same topic or subject as domain of discourse 31, or may relate to topics or subjects different from the topic or subject of domain of discourse 31 so as to provide the student with a broad variety of content areas from which the domain of discourse most relevant to the student can be selected. As with the domain of discourse 31, the domains of discourse 31' and 31" each include a plurality of passages arranged hierarchically according to their levels of reading difficulty or content. The semantic space module 34 or a different semantic space module of the reading tutoring system automatically evaluates a student-submitted summary of an assigned passage from the domains of discourse 31' or 31" in the manner discussed above and, based on this evaluation, the reading tutoring system 28 determines the next passage of appropriate difficulty that the student should read next.

The reading tutoring system 28 includes at least one semantic space module 34, but may include one or more additional semantic space modules, such as semantic space modules 34' and 34" shown in FIG. 2, for performing different analytical functions of the reading tutoring system. The semantic space modules each comprises a body of software for executing a semantic space method or procedure by which textual input, i.e. a student-submitted summary, is accepted and is related to data produced by a machine-learning method or procedure, such as latent semantic analysis (LSA), HAL, EM (Expected Means) or other machine-learning methods. The semantic space modules may incorporate semantic space algorithms for accepting the textual input and relating its component words to the data produced by the machine-learning method, which may be executed using a machine-learning algorithm. The present invention can be implemented using semantic spaces produced by any suitable machine-learning method, and the reference herein to latent semantic analysis (LSA) is for exemplary purposes to simplify description of the present invention. Accordingly, as described herein by way of example, the machine-learning method incorporates data derived from latent semantic analysis (LSA), a fully automatic mathematical/statistical technique for extracting and inferring relations of expected contextual usage of words in passages of discourse. LSA is a method for determining and representing the similarity of meaning of words and passages. After processing a large sample of text, LSA represents the words used in it, and any set of these words—such as those contained in a sentence, paragraph, or essay, either taken from the original text or another source—as points in a very high dimensional (e.g., 50–1000) content vector space or "semantic space." LSA may be viewed as a special kind of machine learning algorithm that learns associative relations between individual words and the meaning-bearing contexts in which they occur. However, LSA utilizes an efficient machine learning method called singular value decomposition (SVD). SVD is a mathematical matrix decomposition technique which allows training on amounts of natural text comparable to those from which humans acquire domain knowledge. The basis of SVD, as used in LSA, is a high-dimensional linear decomposition of a matrix containing data on the frequency of use of thousands of individual words in thousands of sentences or paragraphs. A dimension reduction step constitutes a form of induction by multiple constraint satisfaction that empirically simulates human judgment of meaning from text to a remarkable degree. U.S. Pat. No. 5,987,446 to Corey et al, U.S. Pat. No. 5,839,106 to Bellegarda U.S. Pat. No. 5,301,019 to Landauer et al., and U.S. Pat. No. 4,839,853 to Deerwester et al., the disclosures of which are incorporated herein by reference, are representative of latent semantic techniques. An EM method is discussed by A. P. Dempster, N. M. Laird and D. B. Rubin in "Maximum Likelihood From Incomplete Data Via the EM Algorithm", Journal of the Royal Statistical Society, Series B (1977), the disclosure of which is incorporated herein by reference. A HAL method is discussed by K. Lund and C. Burgess in "Producing High-Dimensional Semantic Spaces From Lexical Co-occurrence", Behavior Research Methods, Instrumentation, and Computers (1996), the disclosure of which is incorporated herein by reference. In the present invention, LSA represents words statistically as data in a high-dimensional vector space to produce one or more semantic spaces, and the semantic space algorithm operates directly on this data or one or more semantic spaces. The results of these operations are used to infer information about the qualities of the textual input and to make decisions based on the inferences. Examples of semantic space methods include evaluating student summaries by reference to the text of the original passage, selecting principle words from the original passage, selecting the next passage for a particular usage, and evaluating the similarity of two passages.

Semantic spaces derived from LSA or other machine-learning methods are used in the reading tutoring systems and methods of the present invention to automatically compare a passage from a domain of discourse with a student-submitted summary of the passage to produce a numerical similarity score indicative of the conceptual or content similarity or congruence between the passage and the student-submitted summary. Higher similarity scores reflect greater congruence between the student's existing semantic structure or schema and that represented by the passage. Hence, higher similarity scores reflect greater comprehension or understanding by the student of the content or subject matter of the passage. Also, semantic spaces are used in the reading tutoring systems and methods of the present invention to automatically select and order the passages that the student should read from the domain of discourse to establish a customized path of optimal learnabilty for the student through the domain of discourse based on the congruence or semantic relatedness between the passage most recently read by the student and the student-submitted summary corresponding thereto, as well as the congruence or semantic relatedness between the student-submitted summary and the other passages in the domain. The path of optimal learnabilty for the student will be one that begins with high, but not total, congruence and gradually moves the student toward greater congruence with larger portions of the domain of discourse.

The voice recognition system 25, which converts oral input or dictation to text, allows a student to submit audible or oral input to the reading tutoring system, in that the audible input is converted to text for processing by the reading tutoring system. The voice recognition system allows a student to submit an oral or dictated summary of a passage 32 for evaluation by the one or more semantic space modules 34, 34' or 34". Regardless of whether it is spoken or typed by the student, the summary is analyzed the same way, although different scores may be used as thresholds. The reading tutoring system 28 is particularly advantageous where a student's current writing skills are poor and/or the improvement of writing skills are not of major concern. In many instances, the acquisition of knowledge of the subject matter of the domain of discourse and/or the ability to perform a non-writing task are often of primary importance. Writing a summary would, for many students, be a confounding factor in the assessment of reading comprehension. The ability of the reading tutoring system 28 to accept summaries as either speech or written input greatly increases its applicability, especially to individuals with disabilities who may not be able to use a keyboard, its ease of use and its effectiveness. The voice recognition system 25 also assists in implementing the fluency tutor module discussed below. The voice recognition system may incorporate commercial speech recognition technology, such as that represented by the speech recognition software systems know as "Naturally Speaking" of Dragon Systems, and "Via Voice" of IBM.

The validity check module 33 includes a body of software for preprocessing a student-submitted summary to check for plagiarism or other anomalies, allowing a suspect summary to be "flagged" for evaluation by a human instructor. The validity check module can operate in various ways to identify suspect summaries in response to one or more detected parameters, such as word usage, word count, i.e, where the summary is too short or too long to be a valid summary, and/or other parameters or peculiarities.

The reading tutoring system 28 provides immediate feedback data 36 to the student, via the computer system 10, regarding the similarity between the student-submitted summary and the corresponding instructional passage, and regarding the passage of the domain of discourse which the student should attempt to read next. The feedback data 36 is based on the student's similarity score and/or some other metric, measurement or indicator reflective of the congruence of the student-submitted summary with the corresponding instructional passage, as determined by the one or more machine learning modules. For example, feedback data 36 may include "pass" or "try again" designations selectively assigned by the reading tutoring system to the student's most recently submitted summary in accordance with the evaluation performed by the one or more machine learning modules. The feedback data 36 may include specific recommendations for improving components of the summary. The feedback data 36 also includes a recommendation or instruction identifying to the student which passage from the domain of discourse the student should read next.

In this manner, the student is guided through the domain of discourse in accordance with the student's existing, prior and developing knowledge, as reflected in the semantic relatedness of the student's summary with the content of the assigned instructional passage. The student may be directed by the reading tutoring system to a particular recommended passage or to select one of several recommended passages to read next. Where the student's most recently submitted summary has obtained a relatively high "pass" score, the one or more passages which the student is directed by the reading tutoring system to read next will typically be of a higher level of reading difficulty than the passage corresponding to the most recently submitted summary. Where the student's most recently submitted summary has obtained a relatively low "pass" score, the one or more passages which the student is directed by the reading tutoring system to read next will typically be at or about the same level of reading difficulty as the passage for which the most recent summary was submitted. Where the student's most recently submitted summary has obtained a "try again" designation, the student is typically directed by the tutoring system to reread the same passage for which the most recent summary was submitted, to read one or more other passages at the same level of difficulty as the passage for which the most recent summary was submitted, or to read one or more passages of a lower level of reading difficulty than the passage for which the most recent summary was submitted. Where the student's most recently submitted summary receives a "try again" designation, feedback data 36 may also include a direction for the student to utilize aspects of a comprehension tutor or other tutors of the reading tutoring system as explained further below. Of course, feedback data 36 may include various additional metrics useful to the student and obtained via the evaluation performed by the one or more semantic space modules, such as an indication of words not understood by the student in the most recently read passage and/or components missing from the student-submitted summary as compared to the original passage. Feedback data 36 also includes feedback information provided in conjunction with comprehension, vocabulary and/or fluency tutors of the reading tutoring system as described further below. The feedback data 36 may be visually displayed on monitor 12, may be delivered audibly and/or may be obtained via printer 26 in tangible print form.

The reading tutoring system 28 preferably includes one or more automated tutors for focused skill development in specific areas such as comprehension or summarizing, vocabulary and/or fluency. Three tutor modules, i.e. a comprehension or summary tutor module 38, a vocabulary tutor module 40 and a fluency tutor module 42, are provided in reading tutoring system 28. The central feature of the comprehension tutor module 38 is direction and practice in constructing a good summary. The comprehension tutor module is a distinct subsystem of the reading tutoring system 28 and comprises a body of software supporting instruction, practice and feedback in some component information processing skills that contribute to reading comprehension. The comprehension tutor module 38 provides information to the student, via computer system 10, relating to summarizing skills as a strategy and product of reading comprehension and provides embedded tutoring features. Keywords, i.e. words that carry special significance with respect to the content and meaning of the passage, may be presented as highlighted terms within the passage. The comprehension tutor module 38 provides interactive summarizing instruction and exercises or activities for the student using passages from the domain of discourse. The comprehension tutor module 38 provides interactive activities designed to improve comprehension skills and may include "drag and drop" activities such as the following: a sequencing activity where the student arranges sentences from the lesson passage into their correct order; a "cloze" activity where a student "drags" appropriate words from a word bank into blank spaces within the lesson passage; and an activity where the student identifies the core concept of a lesson passage and its related ideas. The comprehension tutor module automatically evaluates the student's performance on the various summarizing activities and provides immediate feedback to the student, as feedback data 36, regarding the student's performance on the summarizing activities. The summarizing exercises may include presentation of a sample summary and the opportunity for the student to submit a practice summary with immediate feedback derived from semantic space methods. The student may compose the practice summary via one or more summary writing activities that provide step-by-step guidance through research-based strategies for summary writing. The summary writing activities may include writing a topic sentence, grouping related ideas, and writing topic sentences for the groups of related ideas. By using the actual lesson passage for practice, optimal conditions are achieved in the comprehension tutor for effective, efficient and engaging learning. Students greatly benefit from repeated reading of the lesson passage, and are able to work on improving their reading summarizing skills using material they need or want to learn, rather than predetermined and irrelevant "canned" material. The methods and measures for practice summaries are the same as those for non-practice summaries in that the practice summaries are evaluated using semantic space methods. The standards and criteria applied to practice summaries are the same as those for non-practice summaries.

The vocabulary tutor complements the main objective of improving the student's comprehension of a lesson passage by focusing on principal vocabulary words in the passage, and serves in its own right to build and strengthen the student's vocabulary as an independent criteria of literacy. The vocabulary tutor module 40, which comprises a body of software, automatically selects principal vocabulary words from the lesson passage for presentation to the student to review and learn. Principal vocabulary words, which may or may not be the same as the key words selected by the comprehension tutor module 38, are selected by the vocabulary tutor module 40 based on word features such as length, frequency of occurrence in printed matter, difficulty, as measured in many published indices, and/or for their novelty and utility with respect to the student's sophistication as a reader. For the principal vocabulary words selected, the vocabulary tutor module 40 presents definitions, synonyms, antonyms, pronunciations, samples of correct usage and/or interactive practice exercises via computer system 10. Preferably, the vocabulary tutor module enables the principal words to be delivered audibly by the computer system so that the student can hear the words spoken while viewing them to reinforce multi-modality learning. In the vocabulary tutor module 40, the production of definitions, synonyms, antonyms, and samples of usage for the principal vocabulary words can be automated in various ways, such as by incorporating the Word Net ® system into the vocabulary tutor module. Word Net ®, developed by the Cognitive Science Laboratory at Princeton University, is an on-line lexical reference system presenting English nouns, verbs, adjectives and adverbs organized into synonym sets, each representing one underlying lexical concept, with different relations linking the synonym sets. The practice exercises may include sample sentences using the principal vocabulary words correctly and incorrectly, with instructions for the student to click "correct" or "incorrect" on the monitor screen for each sentence. Additionally, the student may be instructed to "drag and drop" words appropriately into areas of the monitor screen labeled "synonyms" and "antonyms". With the use of voice recognition system 25, the student may submit an audible reading of one or more principal vocabulary words for a determination whether the student is able to say the one or more words correctly. Information regarding the student's performance on practice exercises is provided as feedback data 36.

The fluency tutor module 42 comprises a body of software permitting delivery of a lesson passage in audibly correct form through playback of a model recording, i.e. an author's or instructor's recitation of a lesson passage, or through a speech synthesis system. The fluency tutor module 42 evaluates a student's recitation of the lesson passage and provides immediate feedback on the speed and accuracy of the student's recitation. The fluency tutor module 42 allows the student to hear an audibly correct reading or model recording of a lesson passage, to read the lesson passage aloud, and to have the student's recitation of the lesson passage automatically evaluated for accuracy and speed against the audibly correct reading. The fluency tutor module may allow the student to listen to one's own reading of the lesson passage. The student's reading of the passage is timed and is translated to text by the voice recognition system for comparison to the original passage, which establishes a model of correct English expression. Immediate feedback on speed and accuracy is provided to the student as feedback data 36. Measures of speed and accuracy derived in the fluency tutor module 42 may be used by guidance algorithm modules in determining optimal guidance of the student through the domain of discourse.

The reading tutoring system 28 may include an authoring unit 44, which comprises a body of software operating in conjunction with the database and the command unit software and/or other software of the reading tutoring system to allow new instructional materials to be entered into the reading tutoring system and to allow existing instructional materials to be modified or deleted. With the authoring unit 44, instructors or system managers can enter new material with minimal authoring effort, such as by typing or scanning materials into the database for the reading tutoring system. Where the material to be entered is instructional text comprising one or more passages, the one or more semantic space modules, 34, 34' or 34" may be used to automatically rate the one or more passages for conceptual relatedness or similarity to existing passages in the domain, and may be used to assign the one or more passages in their proper location within the domain. Passages to be entered may be rated using other known measures of readability, and this may be accomplished automatically using separate software. Once the conceptual relatedness between passages to be entered and existing passages of the domain has been identified, the instructor or system manager can enter the passages in the domain at their proper locations, respectively.

Figure 3:
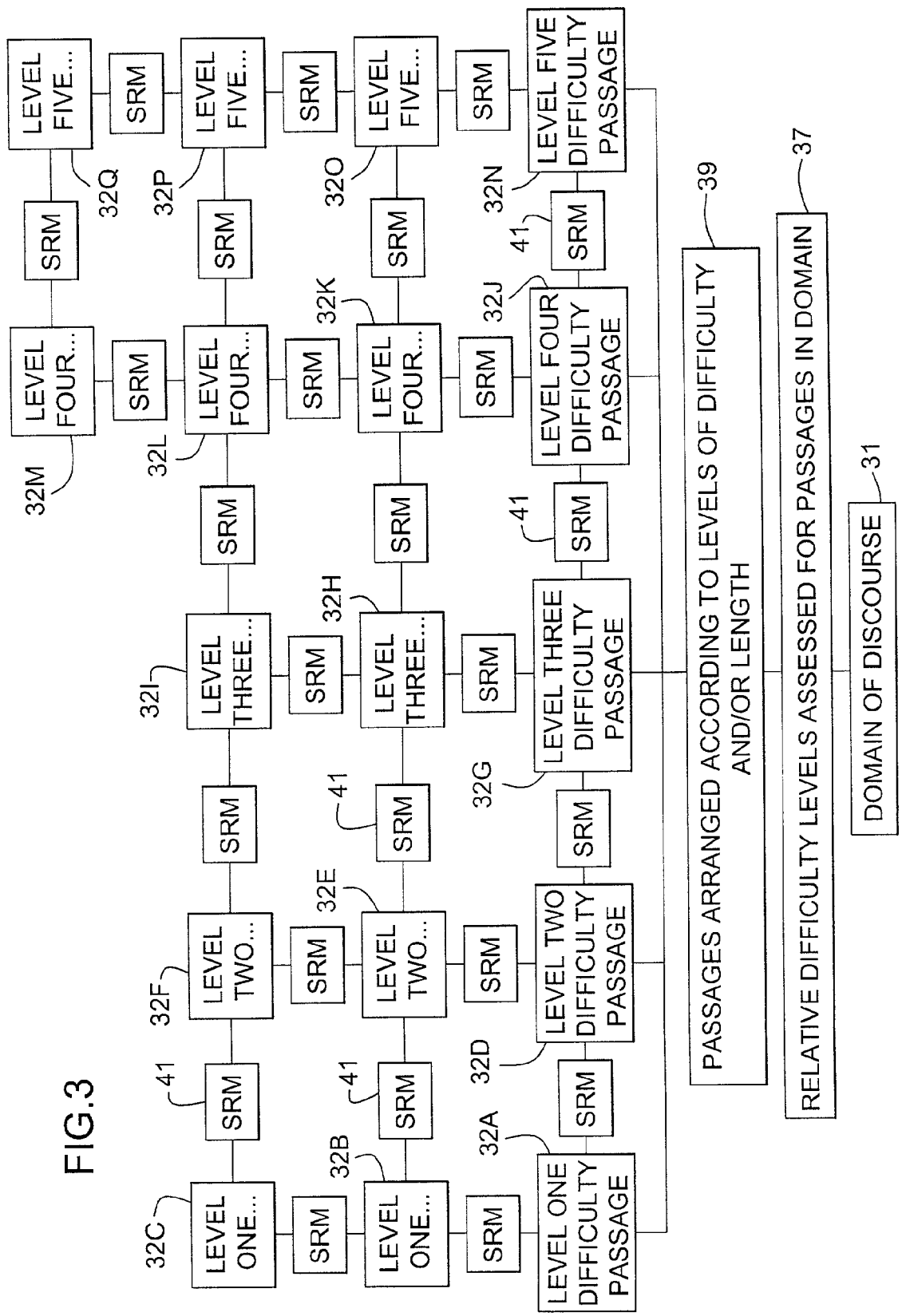
FIG. 3 is a block diagram illustrating a domain of discourse for the reading tutoring system of FIG. 2.

In the reading tutoring systems and methods of the present invention, the one or more domains of discourse are analyzed and structured into a hierarchy of passages of different levels of reading difficulty as determined, for example, from passage length and readability or based on the semantic complexity of their content. As shown in FIG. 3 for the domain of discourse 31, the passages within the domain are assessed for reading difficulty as represented by step 37 and are arranged or grouped according to their levels of reading difficulty and/or length as represented by step 39. FIG. 3 illustrates the passages assigned different levels of difficulty from Level One (least difficult) to Level Five (most difficult), with there being a plurality or group of different passages at each level. FIG. 3 illustrates passages 32A, 32B and 32C of Level One reading difficulty, passages 32D, 32E and 32F of Level Two reading difficulty, passages 32G, 32H and 32I of Level Three reading difficulty, passages 32J, 32K, 32L and 32M of Level Four reading difficulty and passages 32N, 32O, 32P and 32Q of Level Five reading difficulty. Thus, when a student is directed by feedback data 36 to read a passage of Level Three difficulty, for instance, the feedback data 36 may direct the student to one of passages 32G, 32H or 32I, or may direct the student to select from passages 32G, 32H and 32I. Of course, the number of levels of difficulty and the number of passages at each level of difficulty can vary, with it being desirable to have many passages at each level. The number of passages at each level of difficulty can be the same or different. FIG. 3 shows a greater number of passages at Level Four and Level Five difficulty due to the greater number of attempts which may be required for students to master these relatively more difficult levels of reading. Preferably, the passages cover a wide range of reading skill levels.

The passages are preferably related topically so that a student can progressively learn a student-specific topic or subject area while progressing through the domain of discourse. Accordingly, passages in Levels One through Five can be related and organized topically so that a student progressing through the domain of discourse learns the relevant subject area. Of course, one or more passages within a particular level of difficulty can be arranged and organized topically since a student may need to read more than one passage at a particular difficulty level.

Various methods can be used to assign difficulty ratings to the passages, including the use of human evaluators and/or readability formulas such as the Degree of Reading Power (DRP) system of Touchstone Applied Scientific Applications or the Lexile Framework of Metametrics, Inc. Difficulty levels may be established using factors such as vocabulary, syntax, text structure and ease of comprehension. The arrangement of passages making up the domain of discourse reflects the relationship among the passages across dimensions of readability and semantic relatedness. For example, from Levels One to Five, readability measures for the passages decrease from "high" (most easily readable) to "low" (least easily readable). A semantic relatedness measure (SRN) 41 is assigned between passages. Accordingly, the manner in which the passages of the domain are arranged reflects the progression of readability and the progression of semantic relatedness between the passages in a two dimensional framework.

Figure 4:
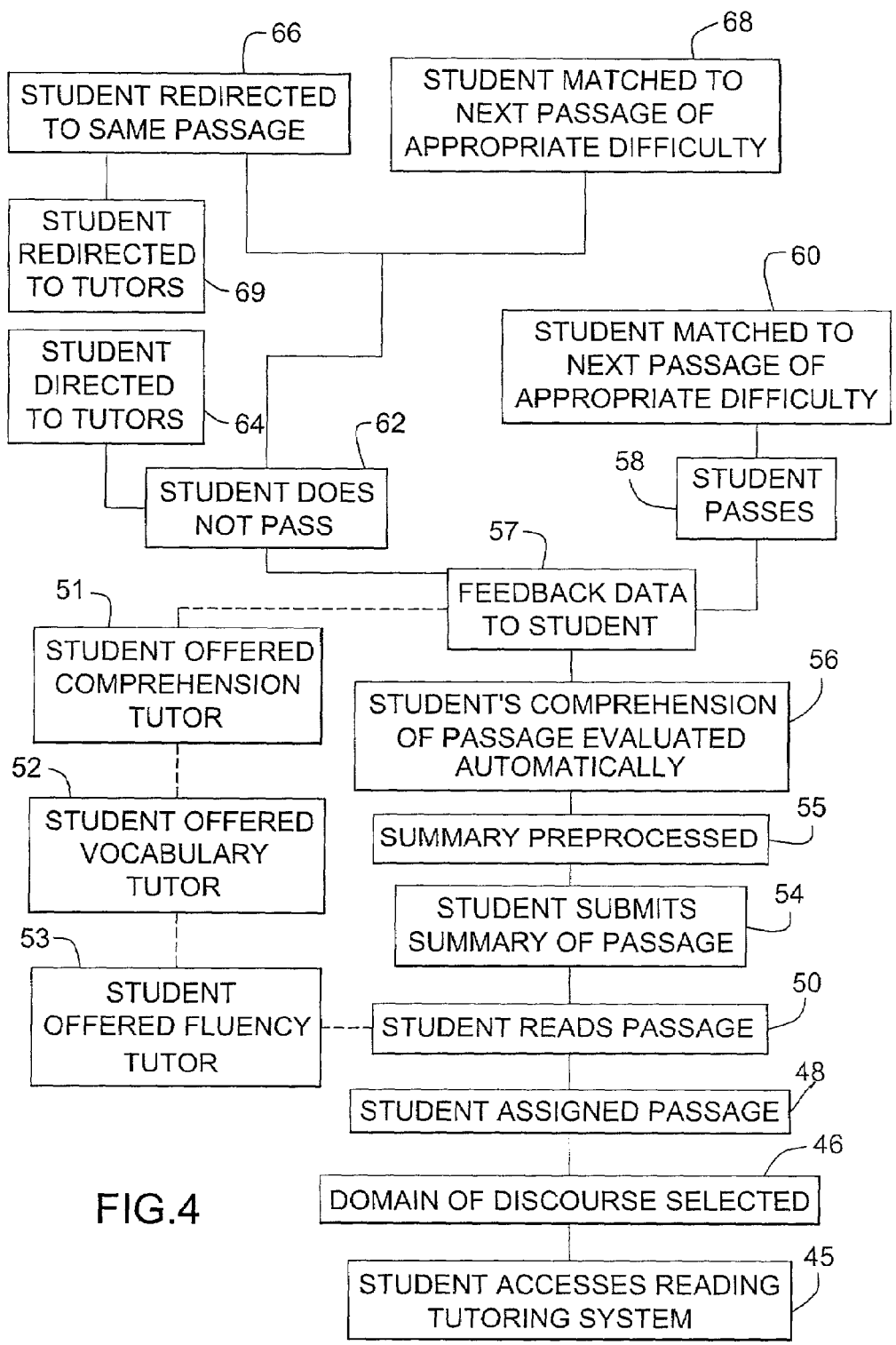
FIG. 4 is a flow diagram illustrating a method of reading tutoring according to the present invention.

A method of reading tutoring according to the present invention is illustrated in flow diagram in FIG. 4. The method of reading tutoring is conducted using computer system 10, by which the reading tutoring system 28 described above is accessed as represented by step 45. Upon accessing the reading tutoring system 28, a domain of discourse, such as domain of discourse 31, is selected for the student as represented by step 46. The domain of discourse may be pre-selected for the student by the reading tutoring system 28 or may be self-selected by the student from a plurality of domains of discourse, such as domains of discourse 31, 31' and 31", available in the reading tutoring system 28.

Once the domain of discourse has been selected for or by the student, the reading tutoring system 28 assigns the student a first passage from the domain of discourse to read and summarize as represented by step 48. The step of assigning the student a first or initial passage may involve selecting a passage from the next to lowest difficulty level, i.e. Level Two for the domain of discourse 31. The step of assigning the student an initial passage may include consideration of data, if available, about the student's current reading level and/or skill. Initially assigning the student a passage of relatively low difficulty insures that the first passage is not too hard for the majority of students. The student can review the assigned passage and, if desired, self-select a passage that is harder or easier so that the student can self-assign the initial passage. Accordingly, a typical student should "pass" the initial level without much difficulty, thereby fostering the student's motivation and interest.

The student reads the first passage that has been assigned, which is displayed on monitor 12, as represented by step 50. Thereafter, the student either uses the comprehension, vocabulary and/or fluency tutors offered by the reading tutoring system, as represented by steps 51, 52 and 53, or submits a summary, typically 25–200 words long, of the first passage to the reading tutoring system as represented by step 54. As explained above, the summary will typically be submitted in writing, i.e. entered using keyboard 18, or orally, using the voice recognition system 25. The student-submitted summary is preprocessed in step 55, which includes utilizing the validity check module 33 to evaluate the summary for plagiarism and/or other anomalies. The step 55 may include preprocessing of the summary for various other purposes including conversion of the summary into a form more suitable for evaluation by the one or more machine learning modules. Preprocessing may be performed in various ways including lemmatization. The summary submitted by the student is automatically analyzed by one or more of the semantic space modules 34, 34' and 34" of the reading tutoring system, as represented by step 56, to obtain a measure of the student's comprehension or understanding of the content of the first passage. Based on the evaluation performed by the one or more semantic space modules, feedback data 36 is provided to the student immediately as represented by step 57. The feedback data may be provided visually on monitor 18, audibly and/or in tangible written form via the printer 26. The feedback data, as described above, includes an indicator reflective of the student's comprehension of the content of the first passage, as determined from the student-submitted summary using semantic space methods.

Where the student-submitted summary has demonstrated sufficient comprehension of the first passage, i.e. the summary and the passage contain appropriately similar concepts, the student may be considered as having "passed" the level of difficulty corresponding to the first passage as shown by step 58. In this case, the student is matched with an appropriate passage to read next, in accordance with the student's current level of reading comprehension determined from the summary just analyzed, as represented by step 60. The level of difficulty of the passage to which the student is directed next may be determined in accordance with the similarity score and/or congruence assigned to the student-submitted summary. For example, where the first passage is of Level Two difficulty and the student's summary achieves a relatively high similarity score, the reading tutoring system may match the student with an appropriate passage of Level Three difficulty or may instruct the student to select from a plurality of appropriate passages of Level Three difficulty in step 60. As another example, where the first passage is of Level Two difficulty and the student's summary achieves a relatively low similarity score, the reading tutoring system may match the student with another passage of Level Two difficulty or may instruct the student to select from a plurality of other passages of Level Two difficulty and high semantic relatedness in step 60 to reinforce the student's learning at the Level Two difficulty level. The one or more passages recommended by the reading tutoring system for the student to read next are provided as feedback data 36 to the student in step 60. The feedback data 36 provided in steps 57 and 60 may include various other metrics pertaining to the student's performance as described above.

Where the student-submitted summary has demonstrated insufficient comprehension of the initially assigned passage, the student may be considered as "not passing" the level of difficulty of the initially assigned passage and is provided with feedback data 36 advising the student to "try again" and/or to follow other designated instructions, as represented by step 62. In this case, the feedback data 36 presented in step 62 may offer or assign the student the comprehension tutor, the vocabulary tutor and/or the fluency tutor as represented by step 64. The feedback data 36 presented in step 62 may direct the student to read the initially assigned passage again as represented by step 66, or may match the student with another passage of appropriate difficulty, such as a passage of the same or lower difficulty than the initially assigned passage but with high semantic relatedness to the student-submitted summary, as represented by step 68. For a first passage of Level Two difficulty, for example, the reading tutoring system may instruct the student to utilize the comprehension tutor module 38 and, thereafter, to read the initially assigned passage again, may match the student with one or more other passages of Level Two difficulty, or may match the student with one or more passages of Level One difficulty, depending on the evaluation of the student's previously submitted summary. After either of steps 60, 66 or 68, the process is repeated with step 50 wherein the student reads the newly assigned passage. At any time before or after submitting a summary, the student may use the comprehension tutor, the vocabulary tutor and/or the fluency tutor by repeating steps 51, 52 and/or 53. If the student is redirected to the same passage in step 66, the student may be offered or assigned the comprehension tutor, the vocabulary tutor and/or the fluency tutor, or may independently access any or all of the tutors as represented by step 69.

A preferred manner of assigning the student a passage to read next uses the following method: where the student's summary is "adequate", the passage to read next is selected using semantic relatedness or similarity to the student's summary; and, when the student's summary is scored as "very good" or "very poor", the passage to read next is randomly selected from the next higher or next lower level, respectively. Another method involves selecting a passage that has an appropriate overlap with the concepts contained in the student's summary, without using readability, where the only structure is the semantic relatedness of the passage.

Figure 5:
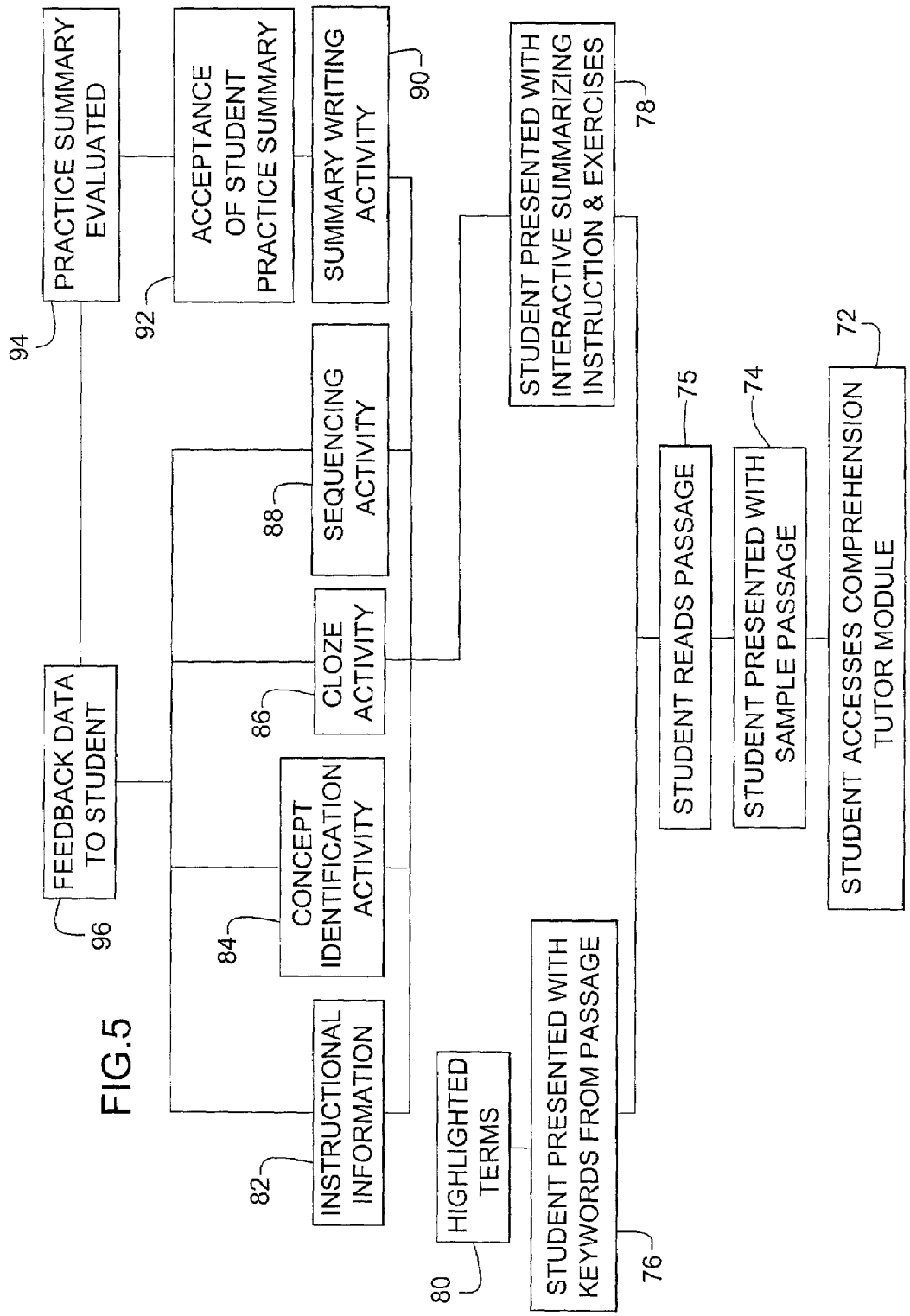
FIG. 5 is a flow diagram illustrating an alternative method of reading tutoring according to the present invention incorporating the use of a comprehension tutor.

FIG. 5 illustrates the additional steps in an alternative reading tutoring method according to the present invention wherein the student utilizes the comprehension or summary tutor module 38, the features of which are also represented by FIG. 5. The comprehension tutor module 38 is accessed by the student via computer system 10 as represented by step 72. The comprehension tutor module 38 presents the student with a sample passage to read as represented by step 74, the sample passage typically being the instructional passage for which the student's reading comprehension is to be evaluated. The student reads the sample passage as represented by step 75, and is presented with key words from the sample passage as represented by step 76 and/or is presented with interactive summarizing and instruction exercises as represented by step 78. The step 76 of presenting the student with key words may include presenting the student with highlighted terms in the sample passage, as indicated by step 80, which step may be self-selected by the student or may be executed automatically in that the highlighted terms can be embedded in the sample passage that the student reads. The step 78 of presenting the student with interactive instruction and summarizing exercises may be executed automatically by the comprehension tutor module or may be offered to the student as a self-selective option. The presentation of interactive summarizing instruction and exercises in step 78 may include presenting the student with instructional information, such as information on how to write a good summary, as represented by step 82, presenting the student with a concept identification activity as represented by step 84, presenting the student with a "cloze" activity as represented by step 86, presenting the student with a sequencing activity as represented by step 88, and/or presenting the student with a summary writing activity as represented by step 90. The step 84 of presenting the student with a concept identification activity includes presenting the student with instructions for identifying core concepts of the lesson passage and its related ideas. The step 86 of presenting the student with a "cloze" activity includes presenting the student with a version of the lesson passage that has a plurality of blank spaces where words are missing and instructions for the student to "drag" or type appropriate words on the monitor screen into the blank spaces to complete the lesson passage correctly. The step 88 of presenting the student with a sequencing activity includes presenting the student with randomly arranged sentences from the lesson passage and instructions for the student to arrange the sentences into their correct order. The step 90 of presenting the student with a summary writing activity may include presenting the student with strategies for summary writing and/or instructions for the student to compose a topic sentence, to group related ideas and/or to compose topic sentences for the groups of related ideas, and/or may include instructions for the student to submit a practice summary to the reading tutoring system, as represented by step 92. Once the practice summary has been accepted by the reading tutoring system in step 92, the practice summary is evaluated by the reading tutoring system in step 94 in the same manner as a non-practice summary as discussed above. Immediate feedback data 36 regarding the student's performance on the exercises or activities of the comprehension tutor is provided to the student as represented by step 96. Where the student submits a practice summary of the sample passage to the reading tutoring system, step 96 includes providing the student information on the quality of the practice summary as discussed above for non-practice summaries.

Figure 6:
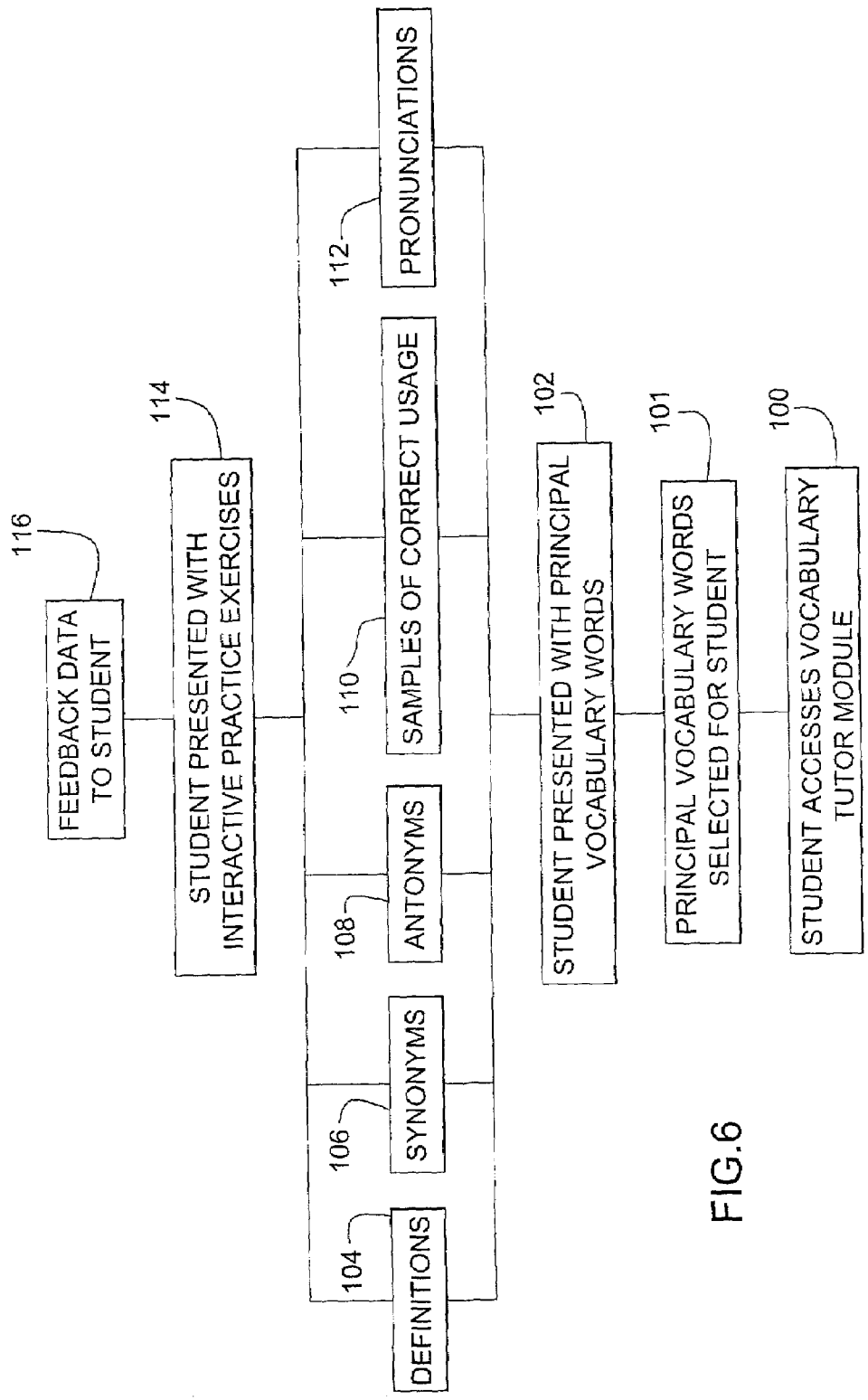
FIG. 6 is a flow diagram illustrating an alternative method of reading tutoring according to the present invention incorporating the use of a vocabulary tutor.

Another alternative reading tutoring method according to the present invention wherein the vocabulary tutor is utilized is illustrated in FIG. 6, which is also representative of the features of the vocabulary tutor. The vocabulary tutor module 40 is accessed by the student via the computer system 10 as represented by step 100. As represented by step 101, the vocabulary tutor module automatically selects principal vocabulary words for the lesson passage read by the student in step 50 described above, the principal vocabulary words being selected based on word features such as length, frequency of occurrence in printed matter, and/or difficulty as measured in a variety of published indices. The student is presented with the principal vocabulary words as represented by step 102, which may include presenting the student with definitions for the principal vocabulary words as represented by step 104, presenting the student with synonyms for the principal vocabulary words as represented by step 106, presenting the student with antonyms for the principal vocabulary words as represented by step 108, presenting the student with samples of correct usage for the principal vocabulary words as represented by step 110 and/or presenting the student with pronunciations for the principal vocabulary words as represented by step 112. Any of the steps 104–112 may be presented to the student automatically or may be self-selected. Any of steps 104, 106, 108, 110 or 112 may include the step 114 of presenting the student with interactive practice exercises. Step 114 may include, for example, the step of presenting the student with sentences using a principal vocabulary word correctly and incorrectly and instructions for the student to "click" "correct" and "incorrect" on the monitor screen for each sentence. Step 114 may include the step of presenting the student with a plurality of words and instructions for the student to "drag and drop" the words into areas of the monitor screen labeled "synonyms" and "antonyms". Step 114 may include instructing the student to submit an audible reading of one or more principal vocabulary words, as implemented via the voice recognition system 25, for a determination whether the student is able to pronounce the one or more words correctly. Immediate feedback for the interactive practice exercises is provided to the student as feedback data 36, as represented in step 116. In the preceding examples, the step 116 may include presenting the student with the correct usages for the sentences, with the correct designations for the words, and with indications of whether the student's pronunciations of the words are correct, with or without accompanying explanations. The step 112 of presenting the student with pronunciations may include presenting the student with audible pronunciations of principal vocabulary words so that the student may listen to the correct pronunciation for a word before and/or after submitting an audible reading of the word.

Figure 7:
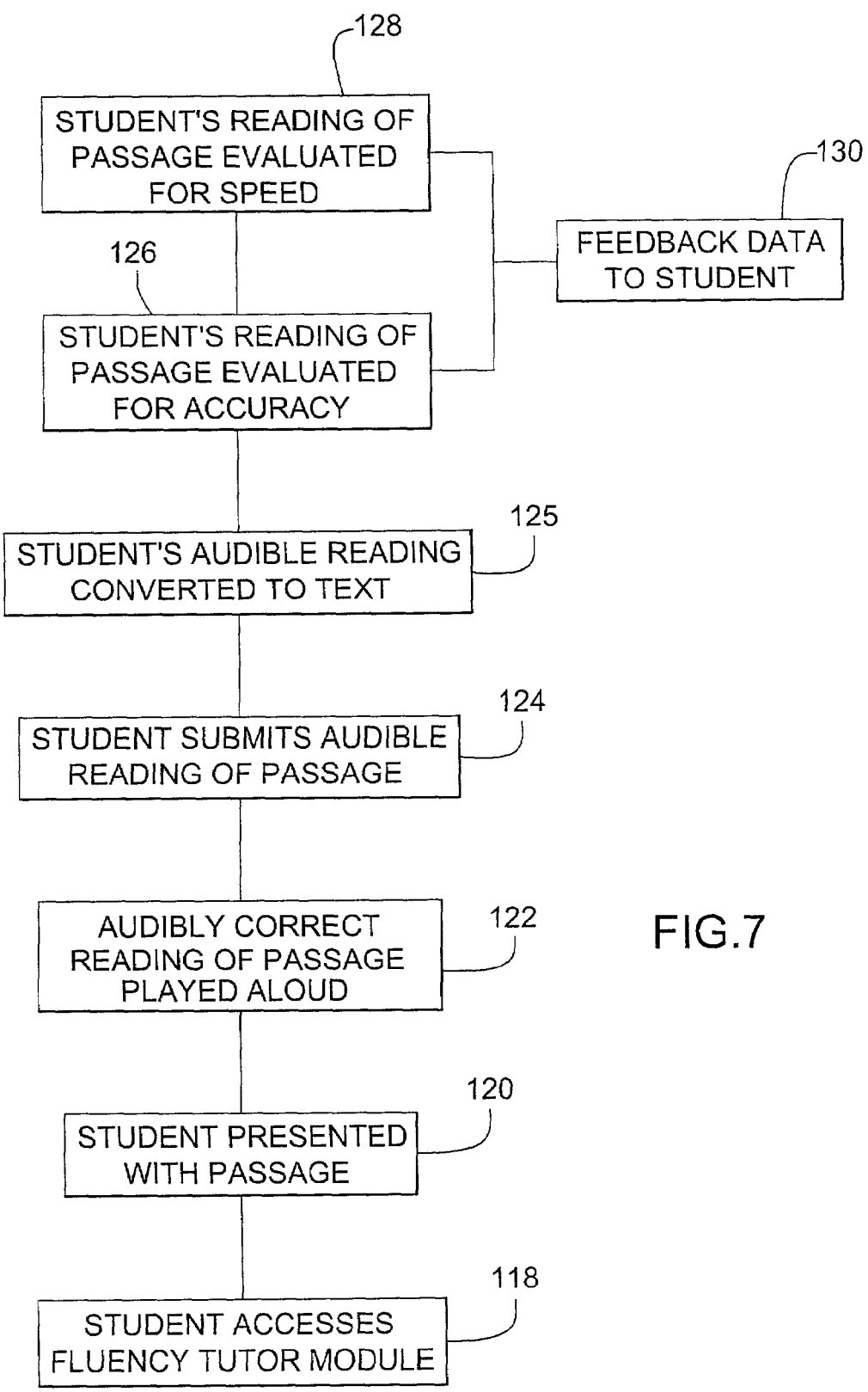
FIG. 7 is a flow diagram illustrating an alternative method of reading tutoring according to the present invention incorporating the use of a fluency tutor.

FIG. 7 illustrates a further alternative method of reading tutoring according to the present invention utilizing the fluency tutor, the features of which are represented in FIG. 7. The fluency tutor module 42 is accessed by the student via computer system 10 as represented by step 118. The student is presented with a sample passage to read aloud, as represented by step 120. Typically, the sample passage is the instructional passage for which the student's reading comprehension is being evaluated, i.e. the passage assigned to the student in step 48. In response to a request entered by the student, an audibly correct reading of the sample passage is played aloud as shown by step 122. After listening to the audibly correct reading, the student may practice reading the sample passage aloud to improve fluency. When the student is ready, the student dictates or submits an audible reading of the sample passage via computer system 10, represented by step 124. The student's audible reading is converted to text in step 125, as made possible by the voice recognition system 25. The student's audible reading of the sample passage is evaluated automatically for accuracy, as indicated by step 126, and speed, as represented by step 128. Based on the evaluation performed in steps 126 and 128, immediate feedback data 36 on the accuracy and speed of the student's audible submission is provided to the student in step 130.

With the reading tutoring systems and methods of the present invention, a student begins learning at an appropriate difficulty level and is thereafter guided to the most appropriate difficulty level for the student in a path of optimal learnability. Different modalities are utilized in the reading tutoring system and methods, thereby accommodating individual learning differences of students. Student summaries can be submitted in written (typed) or audible forms such that reading comprehension skill is not confounded with writing skill. A student's prior and developing knowledge is used to match the student to the most appropriate instructional passages. The instructional passages are arranged in a "curriculum" that is matched to an individual student in a manner that maintains motivation and optimizes learning. The task of improving reading comprehension is embedded within instructional material that contains knowledge the student wants or needs to acquire. The process of constructing large corpora of instructional text spanning a wide range of reading skill levels is facilitated and made more accurate. The validity and reliability of measures taken to construct instructional passages is promoted. The instructional text may contain a broad variety of content areas appealing to diverse students. Word recognition and lower-level lexical processing during reading are facilitated. Speech recognition technology integrates oral input with the assessment and instructional methods. The graphical user interface integrates assessment with instruction so that students with a history of unsuccessful reading and testing will feel more comfortable and less intimidated. Motivation to learn is enhanced, thereby improving the rate and extent of a student's acquisition of reading comprehension skills and knowledge of the subject matter. The special characteristics of adult learners are accounted for and capitalized on. Immediate feedback is provided to the student on how well the student is understanding the instructional material. A student is able to access automated tutors for more focused and specialized skill development in the areas of comprehension, vocabulary and/or fluency. A student is automatically guided to the next instructional passage that is most likely to improve the student's comprehension. Validity checks can be incorporated to "flag" suspect summaries. Student-submitted summaries may be preprocessed in various ways, including lemmatization, for various purposes, including validity and/or conversion of the summaries into a more desirable form for evaluation by the semantic space module. The comprehension, vocabulary and fluency tutors enhance the acquisition of reading and interrelated skills in an automated, interactive environment. The tutors provide a more complete understanding of a student's current reading competence and any special needs. Students, particularly adults, can learn and practice difficult skills in a private environment. Reading comprehension can be improved for students in various applications including military, civilian, academic and non-academic applications. The reading tutoring systems and methods can be used anytime and anywhere there is access to a computer or Internet connection.

The reading tutoring systems and methods could include graphical maps for various purposes, such as representing story structure to reinforce its effect on reading comprehension. The authoring unit may be designed to provide authoring support for the comprehension, vocabulary and fluency tutors. The authoring unit may provide textual entry and editing support for the tutor modules allowing the instructor or system manager to add, modify, or delete items or text from the tutor modules and/or the feedback data therefor. The authoring unit may also support audio recording and playback to allow the instructor or system manager to record and save audio input. The authoring unit may additionally support and implement speech recognition training whereby the student can "train" the voice recognition system to the student's own speech and voice. The authoring unit may allow such "training" to be accomplished using reading material automatically selected for a particular student in accordance with the student's current reading level. The authoring unit may be designed to automatically enter new instructional passages at their proper locations in the domain. The authoring unit may utilize semantic space methods, such as semantic space algorithms, to evaluate instructional passages to be entered, such as in relation to those already entered, in order to determine the proper locations for the instructional passages to be entered. It should be appreciated from the foregoing that the authoring unit can be designed in various ways to facilitate customization of the reading tutoring system, including customization of the individual tutors, with minimal human effort and intervention. Semantic space methods, such as semantic space algorithms, may be utilized to construct the domain of discourse in that a number of passages may first be rated for difficulty by human evaluators, the Lexile framework or another rating system, and then measures of semantic similarity between the rated passages and all remaining passages in the domain may be used to rate the remaining passages for semantic relatedness. The one or more semantic space modules of the reading tutoring system can be used to automatically assess the difficulty of the passages of the domain and to automatically arrange or group the passages according to their assessed levels of difficulty. Use of the comprehension tutor may include presenting the student with multiple-choice tasks of locating the main ideas, key concepts and important and unimportant details from the sample passage. Student-submitted summaries may be evaluated in various ways by using semantic space methods including comparison of student-submitted summaries to the original lesson passages, to model summaries and/or to random summaries.

Although the command unit, the semantic space module, the authoring unit, the validity check, the comprehension tutor, the vocabulary tutor and the fluency tutor have been shown as separate "units" or "modules", it should be appreciated that the software for each may be part of a single body of operating software. All or portions of the software for executing the functions of the tutor modules, the command unit, the semantic space module, the authoring unit, the validity check module, and/or other functions or features of the reading tutoring systems and methods may be part of the operating software and may be integrated with or distinct from one another.

Having described preferred embodiments of reading tutoring systems and methods, it is believed that other modifications, variations and changes will be suggested to those skilled in the art in view of the teachings set forth herein. It is therefore to be understood that all variations, modifications and changes are believed to fall within the scope of the present invention as defined by the pending claims.

What is claimed is:

1. An automated, computer-based reading tutoring system comprising
   at least one domain of discourse accessible by a student via a computer system, said at least one domain of discourse including a plurality of instructional passages of different, predetermined levels of reading difficulty available for the student to read via a monitor of the computer system;
   semantic space method means for receiving a summary prepared by the student and submitted via the computer system of one of said instructional passages read by the student, said semantic space method means being adapted to automatically evaluate the summary for congruence with said one of said instructional passages and to automatically determine which of said instructional passages from said domain of discourse the student should read next based on the congruence of the summary with said one of said instructional passages; and
   immediate feedback data capable of being provided to the student via the computer system and including an indicator reflective of the congruence of the summary with said one of said instructional passages and including the identity of which of said instructional passages the student should read next.

2. The automated, computer-based reading tutoring system as recited in claim 1 and further including one or more semantic spaces produced by a machine-learning method and wherein said semantic space method means includes one or more semantic space algorithms operating on said one or more semantic spaces.

3. The automated, computer-based reading tutoring system as recited in claim 2 wherein said machine-learning method includes a machine learning algorithm incorporating latent semantic analysis.

4. The automated, computer-based reading tutoring system as recited in claim 2 and further including a graphical user interface by which said reading tutoring system communicates with the student via the computer system.

5. An automated, computer-based reading tutoring system comprising
   at least one domain of discourse accessible by a student via a computer system, said at least one domain of discourse including a plurality of instructional passages of different, predetermined levels of reading difficulty available for the student to read via a monitor of the computer system;
   a comprehension tutor module accessible by the student via the computer system, said comprehension tutor module being adapted to present the student with interactive summarizing instruction and exercises via the computer system;
   one or more semantic spaces produced by a machine-learning method;
   semantic space method means for receiving a summary prepared by the student and submitted via the computer system of one of said instructional passages read by the student, said semantic space method means including one or more semantic space algorithms operating on said one or more semantic spaces, said semantic space method means being adapted to automatically evaluate the summary for congruence with said one of said instructional passages and to automatically determine which of said instructional passages from said domain of discourse the student should read next based on the congruence of the summary with said one of said instructional passages; and immediate feedback data capable of being provided to the student via the computer system and including an indicator reflective of the congruence of the summary with said one of said instructional passages and including the identity of which of said instructional passages the student should read next.

6. The automated, computer-based reading tutoring system as recited in claim 5 wherein said comprehension tutor module is adapted to communicate key words from said one of said instructional passages.

7. The automated, computer-based reading tutoring system as recited in claim 5 wherein said comprehension tutor module is adapted to present the student with a cloze activity.

8. The automated, computer-based reading tutoring system as recited in claim 5 wherein said comprehension tutor module is adapted to present the student with a sequencing activity.

9. The automated, computer-based reading tutoring system as recited in claim 5 wherein said comprehension tutor module is adapted to present the student with a concept identification activity.

10. The automated, computer-based reading tutoring system as recited in claim 5 wherein said comprehension tutor module is adapted to present the student with a summary writing activity including the option to submit a practice summary, said semantic space method means is adapted to receive a practice summary prepared by the student and submitted via the computer system and to automatically evaluate the practice summary to assess the student's reading comprehension, and said immediate feedback data includes information regarding the quality of the practice summary as a measure of reading comprehension.

11. An automated, computer-based reading tutoring system comprising at least one domain of discourse accessible by a student via a computer system, said at least one domain of discourse including a plurality of instructional passages of different, predetermined levels of reading difficulty available for the student to read via a monitor of the computer system;

a vocabulary tutor module accessible by the student via the computer system, said vocabulary tutor module being adapted to communicate principal vocabulary words from said one of said instructional passages to the student via the computer systems including definitions, synonyms, antonyms and samples of correct usage, and to present the student with interactive practice exercises for said principal vocabulary words, said vocabulary tutor module being adapted to automatically evaluate the student's performance on said interactive practice exercises;

one or more semantic spaces produced by a machine-learning method;

semantic space method means for receiving a summary prepared by the student and submitted via the computer system of one of said instructional passages read by the student, said semantic space method means including one or more semantic space algorithms operating on said one or more semantic spaces, said semantic space method means being adapted to automatically evaluate the summary for congruence with said one of said instructional passages and to automatically determine which of said instructional passages from said domain of discourse the student should read next based on the congruence of the summary with said one of said instructional passages; and immediate feedback data capable of being provided to the student via the computer system and including an indicator reflective of the congruence of the summary with said one of said instructional passages and including the identity of which of said instructional passages the student should read next, said immediate feedback data including information regarding the student's performance on said interactive practice exercises.

12. The automated, computer-based reading tutoring system as recited in claim 11 wherein said vocabulary tutor module selects the principal vocabulary words to be communicated based on word features.

13. The automated, computer-based reading tutoring system as recited in claim 12 wherein said vocabulary tutor module selects the principal vocabulary words based on word features including word length and commonality.

14. The automated, computer-based reading tutoring system as recited in claim 11 wherein said vocabulary tutor module is adapted to present the student with an interactive practice exercise including sentences using the principal vocabulary words correctly and incorrectly.

15. The automated, computer-based reading tutoring system as recited in claim 11 wherein said vocabulary tutor module is adapted to present the student with an interactive practice exercise including identification of synonyms and antonyms for the principal vocabulary words.

16. The automated computer-based reading tutoring system as recited in claim 11 and further including a voice recognition system capable of receiving audible input from a student via the computer system, said vocabulary tutor module being adapted to present the student with an interactive practice exercise allowing the student to submit an audible reading of the principal vocabulary words for determination of correct pronunciation.

17. An automated, computer-based reading tutoring system comprising at least one domain of discourse accessible by a student via a computer system, said at least one domain of discourse including a plurality of instructional passages of different, predetermined levels of reading difficulty available for the student to read via a monitor of the computer system;

a voice recognition system capable of receiving audible input from a student via the computer system;

a fluency tutor module accessible by the student via the computer system, said fluency tutor module being adapted to audibly communicate an audibly correct reading of said one of said instructional passages to the student via the computer system, to receive an audible reading of said one of said instructional passages by the student via the computer system, and to automatically evaluate the audible reading for accuracy and speed;

one or more semantic spaces produced by a machine-learning method;

semantic space method means for receiving a summary prepared by the student and submitted via the computer system of one of said instructional passages read by the student, said semantic space method means including one or more semantic space algorithms operating on said one or more semantic spaces, said semantic space method means being adapted to automatically evaluate the summary for congruence with said one of said instructional passages and to automatically determine which of said instructional passages from said domain of discourse the student should read next based on the congruence of the summary with said one of said instructional passages; and immediate feedback data capable of being provided to the student via the computer system and including an indicator reflective of the congruence of the summary with said one of said instructional passages and including the identity of which of said instructional passages the student should read next, said immediate feedback data including information regarding the accuracy and speed of the audible reading.

18. An automated, computer-based reading tutoring system comprising
at least one domain of discourse accessible by a student via a computer system, said at least one domain of discourse including a plurality of instructional passages of different, predetermined levels of reading difficulty available for the student to read via a monitor of the computer system;
a semantic space derived from a machine learning method;
a semantic space module for receiving a summary prepared by the student and submitted via the computer system of one of said instructional passages read by the student, said semantic space module operating on said semantic space to automatically evaluate the summary for congruence with said one of said instructional passages and to automatically determine which of said instructional passages from said domain of discourse the student should read next based on the congruence of the summary with said one of said instructional passages; and
immediate feedback data capable of being provided to the student via the computer system and including an indicator reflective of the congruence of the summary with said one of said instructional passages and including the identity of which of said instructional passages the student should read next.

19. The automated, computer-based reading tutoring system as recited in claim 18 wherein said semantic space is derived from latent semantic analysis.

20. The automated, computer-based method of reading tutoring as recited in claim 18 wherein said semantic space module includes a semantic space algorithm operating on said semantic space.

21. An automated, computer-based method of reading tutoring comprising the steps of
providing a domain of discourse accessible by a student via a computer system and including a plurality of instructional passages of different, predetermined levels of reading difficulty;
selecting one of the instructional passages to appear on a monitor of the computer system for the student to read;
receiving a summary of the selected instructional passage prepared by the student and submitted via the computer system;
automatically evaluating the summary for congruence with the selected instructional passage to obtain a measure of the student's reading comprehension;
automatically selecting an instructional passage from the domain of discourse that the student should optimally read next based on the measure of the student's reading comprehension;
communicating feedback data to the student, via the computer system, including an indicator reflective of the student's reading comprehension and the identity of the instructional passage that the student should optimally read next; and
repeating said receiving, said automatically evaluating, said automatically selecting and said communicating steps for the instructional passage that the student reads next.

22. The automated, computer-based method of reading tutoring as recited in claim 21 wherein said step of receiving includes receiving an audible summary from the student.

23. The automated, computer-based method of reading tutoring as recited in claim 21 wherein said step of automatically evaluating and said step of automatically selecting are performed using semantic space algorithms.

24. An automated, computer-based method of reading tutoring comprising the steps of
providing a domain of discourse accessible by a student via a computer system and including a plurality of instructional passages of different, predetermined levels of reading difficulty;
selecting one of the instructional passages to appear on a monitor of the computer system for the student to read;
receiving a summary of the selected instructional passage prepared by the student and submitted via the computer system;
automatically evaluating the summary for congruence with the selected instructional passage to obtain a measure of the student's reading comprehension;
automatically selecting an instructional passage from the domain of discourse that the student should optimally read next based on the measure of the student's reading comprehension, said step of automatically evaluating and said step of automatically selecting being performed using semantic space algorithms, said step of automatically selecting including selecting the passage that the student should optimally read next based on the congruence of the summary with the previously selected instructional passage;
communicating feedback data to the student, via the computer system, including an indicator reflective of the student's reading comprehension and the identity of the instructional passage that the student should optimally read next; and
repeating said receiving, said automatically evaluating, said automatically selecting and said communicating steps for the instructional passage that the student reads next.

25. An automated, computer-based method of reading tutoring comprising the steps of
providing a domain of discourse accessible by a student via a computer system and including a plurality of instructional passages of different, predetermined levels of reading difficulty;
selecting one of the instructional passages to appear on a monitor of the computer system for the student to read;
receiving a summary of the selected instructional passage prepared by the student and submitted via the computer system;
automatically evaluating the summary for congruence with the selected instructional passage to obtain a measure of the student's reading comprehension;
automatically selecting an instructional passage from the domain of discourse that the student should optimally read next based on the measure of the student's reading comprehension, said step of automatically evaluating and said step of automatically selecting being performed using semantic space algorithms, said step of automatically selecting including selecting the passage that the student should optimally read next based on the congruence of the summary with the other passages in the domain;

communicating feedback data to the student, via the computer system, including an indicator reflective of the student's reading comprehension and the identity of the instructional passage that the student should optimally read next; and repeating said receiving, said automatically evaluating, said automatically selecting and said communicating steps for the instructional passage that the student reads next.

26. An automated, computer-based method of reading tutoring comprising the steps of providing a domain of discourse accessible by a student via a computer system and including a plurality of instructional passages of different, predetermined levels of reading difficulty;

selecting one of the instructional passages to appear on a monitor of the computer system for the student to read;

providing the student access to an automated comprehension tutor via the computer system;

providing the student access to an automated vocabulary tutor via the computer system;

providing the student access to an automated fluency tutor via the computer system;

receiving a summary of the selected instructional passage prepared by the student and submitted via the computer system;

automatically evaluating the summary for congruence with the selected instructional passage to obtain a measure of the student's reading comprehension;

automatically selecting an instructional passage from the domain of discourse that the student should optimally read next based on the measure of the student's reading comprehension;

communicating feedback data to the student, via the computer system, including an indicator reflective of the student's reading comprehension and the identity of the instructional passage that the student should optimally read next; and repeating said steps of providing the student access to the comprehension tutor, the vocabulary tutor and the fluency tutor, said step of receiving, said step of automatically evaluating, said step of automatically selecting and said step of communicating for the instructional passage that the student reads next.

27. The automated, computer-based method of reading tutoring as recited in claim 26 wherein said step of providing the student access to a comprehension tutor includes communicating, via the computer system, key words to the student from the selected instructional passage and presenting the student with interactive summarizing instruction and exercises, and said step of communicating feedback data includes communicating information regarding the student's performance on the interactive summarizing exercises.

28. The automated, computer-based method of reading tutoring as recited in claim 26 wherein said step of providing the student access to a vocabulary tutor includes communicating, via the computer system, principal vocabulary words to the student from the selected instructional passage including definitions, synonyms, antonyms, samples of correct usage, and interactive practice exercises for the principal vocabulary words, and said step of communicating feedback data includes communicating information regarding the student's performance on the interactive practice exercises.

29. The automated, computer-based method of reading tutoring as recited in claim 28 wherein said step of communicating principal vocabulary words includes selecting the principal vocabulary words based on one or more word features.

30. The automated, computer-based method of reading tutoring as recited in claim 29 wherein said step of selecting the principal vocabulary words includes selecting the principal vocabulary words based on word features including word length, frequency of occurrence in printed matter and word difficulty.

31. The automated, computer-based method of reading tutoring as recited in claim 26 wherein said step of providing the student access to a fluency tutor includes audibly communicating an audibly correct reading of the selected instructional passage to the student via the computer system, receiving an audible reading of the selected instructional passage by the student via the computer system and automatically evaluating the audible reading for accuracy and speed against the correct reading, and said step of communicating feedback data includes communicating information regarding the accuracy and speed of the audible reading.

32. An automated, computer-based method of reading tutoring comprising the steps of providing a domain of discourse accessible by a student via a computer system and including a plurality of instructional passages of different, predetermined levels of reading difficulty;

selecting one of the instructional passages to appear on a monitor of the computer system for the student to read;

receiving a summary of the selected instructional passage prepared by the student and submitted via the computer system;

automatically evaluating the summary for congruence with the selected instructional passage to obtain a measure of the student's reading comprehension;

automatically selecting an instructional passage from the domain of discourse that the student should optimally read next based on the measure of the student's reading comprehension, said step of automatically selecting including selecting the instructional passage that the student should optimally read next based on the congruence of the summary with other passages in the domain of discourse;

communicating feedback data to the student, via the computer system, including an indicator reflective of the student's reading comprehension and the identity of the instructional passage that the student should optimally read next; and repeating said receiving, said automatically evaluating, said automatically selecting and said communicating steps for the instructional passage that the student reads next.

33. An automated, computer-based method of reading tutoring comprising the steps of providing a domain of discourse accessible by a student via a computer system and including a plurality of instructional passages of different, predetermined levels of reading difficulty;

selecting one of the instructional passages to appear on a monitor of the computer system for the student to read;

receiving a summary of the selected instructional passage prepared by the student and submitted via the computer system;

automatically evaluating the summary for congruence with the selected instructional passage to obtain a measure of the student's reading comprehension;

automatically selecting an instructional passage from the domain of discourse that the student should optimally read next based on the measure of the student's reading comprehension, said step of automatically selecting including selecting the instructional passage that the student should optimally read next based on the congruence of the summary with the previously selected instructional passage;

communicating feedback data to the student, via the computer system, including an indicator reflective of the student's reading comprehension and the identity of the instructional passage that the student should optimally read next; and repeating said receiving, said automatically evaluating, said automatically selecting and said communicating steps for the instructional passage that the student reads next.

34. An automated, computer-based method of reading tutoring comprising the steps of providing a domain of discourse accessible by a student via a computer system and including a plurality of instructional passages of different, predetermined levels of reading difficulty;

selecting one of the instructional passages to appear on a monitor of the computer system for the student to read;

receiving a summary of the selected instructional passage prepared by the student and submitted via the computer system;

automatically checking the summary for validity;

automatically evaluating the summary for congruence with the selected instructional passage to obtain a measure of the student's reading comprehension;

automatically selecting an instructional passage from the domain of discourse that the student should optimally read next based on the measure of the student's reading comprehension;

communicating feedback data to the student, via the computer system, including an indicator reflective of the student's reading comprehension and the identity of the instructional passage that the student should optimally read next; and repeating said receiving, said automatically evaluating, said automatically selecting and said communicating steps for the instructional passage that the student reads next.

35. An automated, computer-based method of self-guided reading tutoring comprising the steps of accessing a computer-based reading tutoring system via a computer system;

viewing a selected instructional passage from a domain of discourse, including a plurality of instructional passages of different, predetermined levels of reading difficulty, of the reading tutoring system on a monitor of the computer system;

reading the selected instructional passage;

preparing a summary of the selected instructional passage;

submitting the summary to the reading tutoring system via the computer system;

receiving immediate feedback data from the reading tutoring system via the computer system including an indicator reflective of the congruence of the summary with the selected instructional passage and including the identity of one or more recommended instructional passages from the domain of discourse that should be read next based on the congruence of the summary with the selected instructional passage; and repeating said steps of viewing, reading, preparing, submitting and receiving for one of the recommended instructional passages.

36. An automated, computer-based method of self-guided reading tutoring comprising the steps of accessing a computer-based reading tutoring system via a computer system;

self-selecting a domain of discourse via the computer system from a plurality of domains of discourse of the reading tutoring system, each domain of discourse including a plurality of instructional passages of different, predetermined levels of reading difficulty;

viewing a selected instructional passage from the selected domain of discourse on a monitor of the computer system;

reading the selected instructional passage;

preparing a summary of the selected instructional passage;

submitting the summary to the reading tutoring system via the computer system;

receiving immediate feedback data from the reading tutoring system via the computer system including an indicator reflective of the congruence of the summary with the selected instructional passage and including the identity of one or more recommended instructional passages from the domain of discourse that should be read next based on the congruence of the summary with the selected instructional passage; and repeating said steps of viewing, reading, preparing, submitting and receiving for one of the recommended instructional passages.

37. The automated, computer-based method of self-guided reading tutoring as recited in claim 35 wherein said step of submitting includes submitting a written summary.

38. The automated, computer-based method of self-guided reading tutoring as recited in claim 35 wherein said step of submitting includes submitting an audible summary.

39. An automated, computer-based method of self-guided reading tutoring comprising the steps of accessing a computer-based reading tutoring system via a computer system;

viewing a selected instructional passage from a domain of discourse, including a plurality of instructional passages of different, predetermined levels of reading difficulty, of the reading tutoring system on a monitor of the computer system;

reading the selected instructional passage;

preparing a practice summary of the selected instructional passage;

submitting the practice summary to the reading tutoring system via the computer system;

receiving immediate feedback data from the reading tutoring system via the computer system including information regarding the quality of the practice summary as a measure of reading comprehension;

preparing a non-practice summary of the selected instructional passage;

submitting the non-practice summary to the reading tutoring system via the computer system;

receiving immediate feedback data from the reading tutoring system via the computer system including an indicator reflective of the congruence of the non-practice summary with the selected instructional passage and including the identity of one or more recommended instructional passages from the domain of discourse that should be read next based on the congruence of the non-practice summary with the selected instructional passage; and repeating said steps of viewing, reading, preparing, submitting and receiving for one of the recommended instructional passages.

40. An automated, computer-based method of self-guided reading tutoring comprising the steps of accessing a computer-based reading tutoring system via a computer system;

viewing a selected instructional passage from a domain of discourse, including a plurality of instructional passages of different, predetermined levels of reading difficulty, of the reading tutoring system on a monitor of the computer system;

reading the selected instructional passage;

viewing principal vocabulary words from the selected instructional passage, including definitions, synonyms, antonyms, and samples of correct usage for the principal vocabulary words, on the monitor;

preparing a summary of the selected instructional passage;

submitting the summary to the reading tutoring system via the computer system;

receiving immediate feedback data from the reading tutoring system via the computer system including an indicator reflective of the congruence of the summary with the selected instructional passage and including the identity of one or more recommended instructional passages from the domain of discourse that should be read next based on the congruence of the summary with the selected instructional passage; and repeating said steps of viewing, reading, preparing, submitting and receiving for one of the recommended instructional passages.

41. The automated, computer-based method of self-guided reading tutoring as recited in claim 40 and further including performing interactive practice exercises, via the computer system, using the principal vocabulary words.

42. An automated, computer-based method of self-guided reading tutoring comprising the steps of accessing a computer-based reading tutoring system via a computer system;

viewing a selected instructional passage from a domain of discourse, including a plurality of instructional passages of different, predetermined levels of reading difficulty, of the reading tutoring system on a monitor of the computer system;

listening to an audibly correct reading of the selected instructional passage via the computer system;

submitting an audible reading of the selected instructional passage to the reading tutoring system via the computer system;

receiving immediate feedback data from the reading tutoring system via the computer system including information regarding the accuracy and speed of the audible reading;

preparing a summary of the selected instructional passage subsequent to reading the instructional passage;

submitting the summary to the reading tutoring system via the computer system;

receiving immediate feedback data from the reading tutoring system via the computer system including an indicator reflective of the congruence of the summary with the selected instructional passage and including the identity of one or more recommended instructional passages from the domain of discourse that should be read next based on the congruence of the non-practice summary with the selected instructional passage; and repeating said steps of viewing, preparing, submitting the summary and receiving an indicator for one of the recommended instructional passages.

* * * * *